United States Patent [19]

Dodson

[11] Patent Number: 4,894,545

[45] Date of Patent: Jan. 16, 1990

[54] LIQUID SCINTILLATION COUNTING

[75] Inventor: Charles L. Dodson, Orange, Calif.

[73] Assignee: Beckman Instruments, Inc., Fullerton, Calif.

[21] Appl. No.: 263,067

[22] Filed: Oct. 27, 1988

[51] Int. Cl.⁴ .......................... G01T 1/208; G01T 1/00
[52] U.S. Cl. .................................... 260/364; 250/328; 250/362
[58] Field of Search .................. 250/364, 328, 362

[56] References Cited

U.S. PATENT DOCUMENTS 4,060,728  11/1977  Horrocks .......................... 250/328
4,761,555   8/1988  Ishikawa .......................... 250/328

FOREIGN PATENT DOCUMENTS 59-00213  4/1984  Japan .

OTHER PUBLICATIONS

"Activity Determination of Disc Samples With Liquid Scintillation Efficiency Tracing Technique," *Applied Radiation Isotopes*, vol. 37, No. 11, pp. 1147-1149 (1986), Fujii, et al.
"Thermal Neutron Reaction Cross Section Measurements for Fourteen Nuclides With a Liquid Scintillation Spectometer," Takiue, *Nuclear Instruments and Methods*, vol. 148, pp. 157-161 (1978).
"Mesure Absolue Directe de l'Activite des Emetteurs Purs par Scintillation Liquide," Kolarov, LeGallic & Vatin, Int. J. Appl. radia. Isot., 21, pp. 443-452.
"Radioassay by an Efficiency Tracing Technique Using a Liquid Scintillation Counter," Ishikawa, et al., *International Journal of Applied Radiation and Isotopes*, vol. 35, No. 6, pp. 463-466 (1984).
"Comments on Aspects of Absolute Activity Measurements Obtained by Liquid Scintillation Counting," Lowenthal, Australian Atomic Energy Commission Research Establishment, Lucas Heights, N.S.W. 2232, pp. 349-362.

*Primary Examiner*—Constantine Hannaher
*Attorney, Agent, or Firm*—William H. May; Paul R. Harder

[57] ABSTRACT

An efficiency extrapolation method is used in liquid scintillation counting for determining activity in an unknown sample. A dynamic and automatic determination of the range of the pulse height spectrum is used to permit a counting measurement in highly quenched samples, and with isotopes having low energy end points. A selected linear regression equation is extrapolated to provide the determination within a predetermined error established by a least squares condition.

19 Claims, 4 Drawing Sheets

LIQUID SCINTILLATION COUNTING

BACKGROUND

This invention is concerned with determining radioactivity by liquid scintillation counting. In particular the invention is directed to effecting such counting by efficiency extrapolation methodology.

In known liquid scintillation counters, the activity of beta-emitting radioisotopes is measured by the use of quench curves, a plot of the counting efficiencies of known standards vs some quench measuring parameter. The activity of an unknown sample is obtained by measurement of its quench level, which gives the counting efficiency from the quench curve and permits calculation of activity from $$\text{Disintegration Per Minute (DPM)} = \frac{\text{Counts Per Minute (CPM)} \times 100}{\text{Efficiency}}$$

This method requires the preparation and counting of several quenched standards of the same radioisotope as the unknown sample. The preparation and counting of such series is time-consuming and demands good laboratory technique.

The method of efficiency extrapolation requires preparation and counting of only one standard sample to enable the recovery of disintegrations per minute of almost all beta, and beta-gamma and alpha emitters. By use of a second standard, the manual method is extended to isotopes with energy below Carbon-14.

In a conventional use of the efficiency extrapolation methodology, at least two restrictions are present: a limitation to narrow quench ranges, for example, greater than about 80% counting efficiency for C-14 and, inapplicability to tritium.

Efficiency extrapolation has been adapted for use in liquid scintillation counting (M. Takiue and H. Ishikawa, *Nucl. Instr. and Meth.* 148, 157 (1978). Takiue and Ishikawa have further disclosed a computerized technique on a liquid scintillation counter (PCT/JP84/00213, filed Apr. 24, 1984, and Ishikawa, Takiue, Aburai, *Int. J. Appl. Isot.* Vol. 35 No. 6, pp. 463-466, 1984). In U.S. Pat. No. 4,060,728 (Horrocks) coupled the technique with direct pulse height measurements produced by external gamma irradiation at a minimum of two different quench levels.

There are at least two drawbacks of the computerized method:

1. It is inapplicable for radioisotopes with energies less than Carbon-14.
2. It depends upon 6 specific fixed regions of the spectrum of the standard, thus limiting its applicability to a small quench range.

The Horrocks method requires at least two measurements of the unknown sample at different quench levels. This requires time and the complexity of adding optical filters to the liquid scintillation counter or chemical quenching agents to the sample. In the latter case, the unknown sample composition is destroyed.

There is accordingly a need to provide for a non-limiting dynamic simple efficiency extrapolation methodology applicable to radiosotopes with energies below C-14.

SUMMARY

The invention provides a dynamic condition to determine the range of the pulse height spectrum to use in the extrapolation method and thereby permits measurement of DPM in highly quenched samples.

The invention defines a dynamic region of the unknown sample spectrum specific for each sample and thereby extends efficiency extrapolation to samples with counting efficiencies less than 80%. Secondly, by use of a second standard, the method is applicable to beta emitters with energy below Carbon-14, for instance, tritium.

A reference sample with known activity is counted and its entire spectrum is analyzed to provide counting efficiencies for each channel of a multi-channel analyzer, namely, a standard. Each channel of the multi-channel analyzer corresponds to an energy range of the beta particle spectrum. Also, there is a corresponding counting efficiency and count range for each channel.

Integrated counting efficiencies are determined from integrated count rates and DPM of the standard and are stored in the instrument for each standard.

A unknown sample is counted and analyzed in the same way. A least squares curve fit uses the integrated count rate of the unknown sample and the counting efficiencies of the standard in the form of a regression equation, namely, modified or selected to be a linear equation:

$$C = D + S(100 - E)$$

C is the count rate, D is the mathematical intercept and DPM of the sample, E the counting efficiency, S the slope, $(100-E)$ is a difference efficiency.

The quench level of the unknown sample determines the region of linearity of the count rate-efficiency plot. Consequently, an iterative application of the least squares method is used until by selection it converges to an apriori defined least squares error. This iteratively defined linear segment, namely, the modified regression equation with an error reduced below a predetermined level for each unknown sample is extrapolated to $(100-E)=0$ to obtain the intercept which is the sample's activity, namely, DPM. In some forms, the modified equation can be exponential or a polynomial.

For radioisotopes with maximum beta energy, Emax, of emission less than Carbon-14, the procedure is identical except a second standard, such as tritium, is used. For samples a radioisotopes with Emax equal to or greater than that of C-14 and highly quenched, the tritium standard can be used. In a preliminary determination relative to the unknown sample, the appropriate standard is selected for determining the sample's activity.

A liquid scintillation counter incorporates analog-to-digital conversion of the photomultiplier tube output together with multi-channel pulse height analysis. This combined with a microprocessor and appropriate memory capacity permits collection and analysis of both the reference standard and the unknown sample spectra.

DRAWINGS

DESCRIPTION

Figure 4:
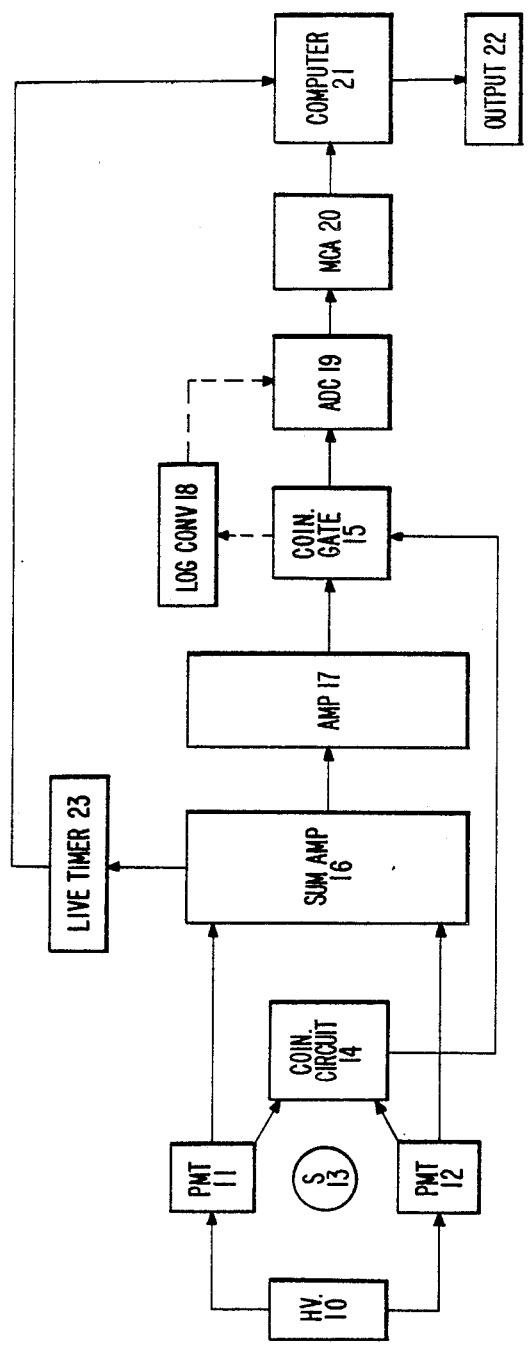
FIG. 4 is a block diagram illustrating the major components of a liquid scintillation counter.

A liquid scintillation counter of FIG. 4 containing a multi-channel analyzer is used for determining activity of an unknown sample.

Block 10 indicates a high voltage control for the photomultiplier tubes which directs power to photomultiplier tubes 11 and 12 located at opposite sides of a sample counting chamber 13. The dual photomultiplier tubes 11 and 12 are oppositely located to sense photons emitted from the radioactive sample 13 in opposite directions. The tube output is to a coincidence circuit 14 which detects the signals from both photomultiplier tubes 11 and 12. Should a signal be received on only one of the photomultiplier tubes 11 or 12, then the circuit 14 determines that the photon pulse is from a non-radioactive source. Should signals be detected by both tubes simultaneously or within the order of $10^{-9}$ seconds, then the circit 14 determination is that the photons are from a radioactive source and should be available for counting. The coincidence circuit 14 feeds a coincidence gate 15 which electronically regulates the photon pulse such that if there are the two countings it is presumed to be subject to a single radioactive event.

The output from the photomultiplier tubes 11 and 12 are also directed to a summation amplifier 16 which adds the two pulses together and thereby increases the sensitivity. This would otherwise be halved on average, if there was only a single photomultiplier tube 11 or 12. The signal is then amplified in the amplifier 17 and is directed to the coincidence gate 15, where it is transmitted for further processing should the determination by the gate 15 be that it is a radioactive pulse to be counted.

From the coincidence gate 15 the signal is directed to a log converter 18 and also to an analog to digital converter 19. The log converter 18 also feeds the analog to digital converter 19. The output from the converter 19 is directed to a multi-channel analyzer 20 which is in turn fed to computer 21 for controlling the operation of the counter and performing calculations in terms of the invention to provide an output 22. Computer 21 is also operationally connected with a live timer 23 which acts to control the circuitry such that when the activity is excessively high only a predetermined number of pulses is passed for processing. The live timer 23 insures that the circuits alternately receives pulses for processing and then processes the pulses. In the processing state further pulses are not received.

A Carbon-14 unquenched reference standard containing 96,500±2412 DPM and a tritium reference standard containing 94,880±2372 DPM are firstly counted in the counter. The counting efficiences and count rate per minute (CPM) obtained per each channel of the multi-channel analyzer are determined. These are extensive data sets involving upwards of 600 channels or data points and this data is represented by the plots in FIGS. 1, 2 and 3.

Figure 1:
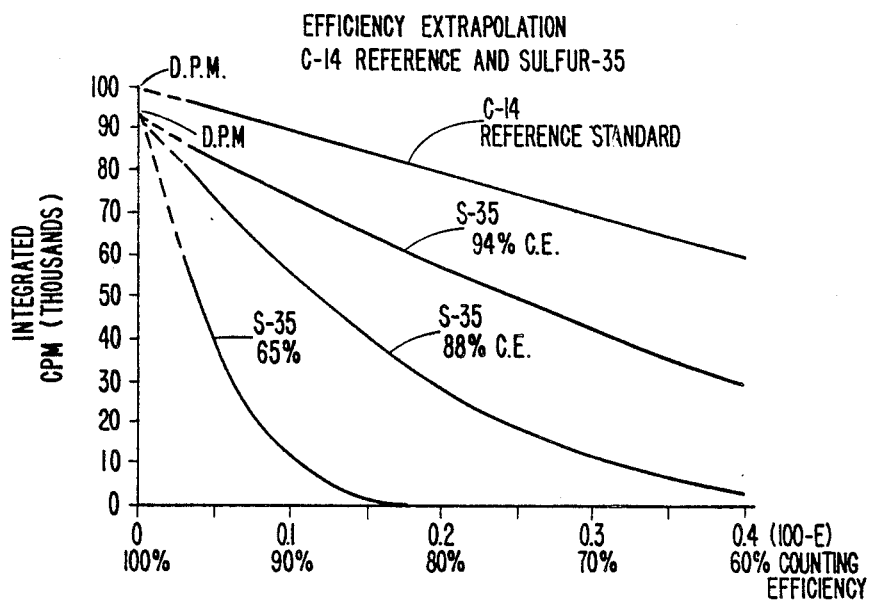
FIG. 1 is a computed efficiency extrapolation plot of the reference sample, Carbon-14, and a series of sulfur-35 samples with counting efficiencies ranging from 95% to 65%.

Three samples of sulfur-35 at various different quench levels namely 94%, 88% and 65% are next counted. Integrated count rates are determined and plotted against the counting efficiencies of the Carbon-14 reference sample as shown in FIG. 1. 100-E is used since the spectrum is integrated from high energy to the threshold of detection.

Figure 2:
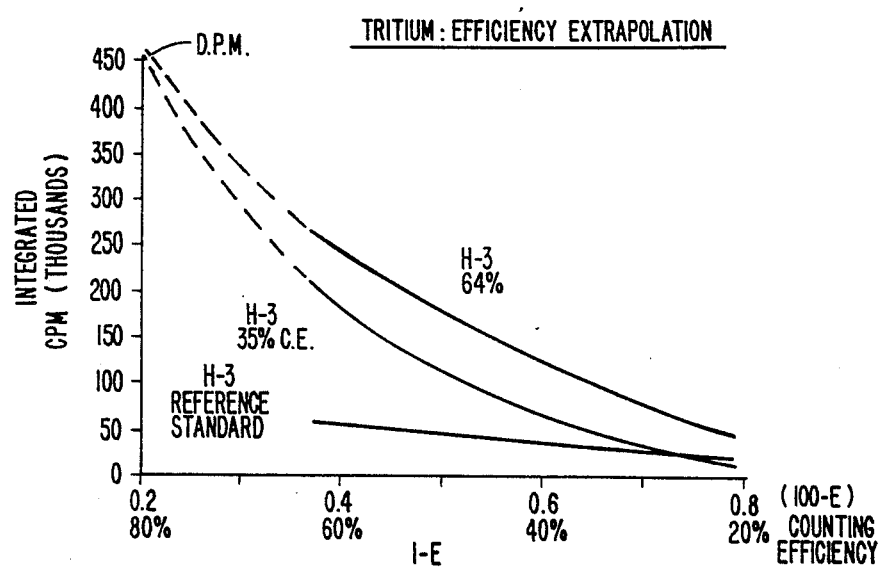
FIG. 2 is a computed efficiency extrapolation plot of the reference sample, tritium, and a series of tritium samples with counting efficiencies ranging from 64% to 35% counting efficiency.
Figure 3:
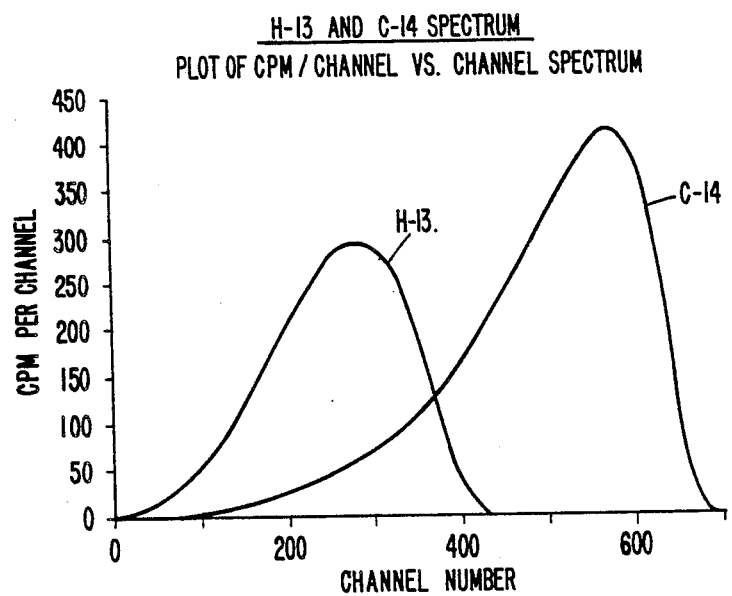
FIG. 3 is a plot of C-14 and H-3 showing CPM obtained per channel by a multi-channel analyzer.

Two samples of tritium at quench levels of 64% and 35% respectively are counted in the same way. The resulting integrated count rate-efficiency plots based on the tritium standard are shown in FIG. 2.

An iterative least square curve fit is performed to determine the correct spectral range to use for the efficiency extrapolation for each sample. This is an automatic and dynamic efficiency extrapolation method which ensures that only the selected appropriate number of windows, energy range, data points or channels are used in the determination of the sample activity. This is performed according to the following exemplary aglorithm.

Should the spectral endpoint of the unknown sample>60 KEV, then the first iteration begins with channels 0–500. Should the spectral endpoint of the unknown sample≦60 KEV, then the first iteration begins with channels 0–400.

Should the square of the correlation coefficient, $R^2$, ≧0.997, then the iteration is stopped and the resulting intercept is used. $R^2$ is a correlation coefficient representing a global constant of linearity. 0.997 is an empirically determined value indicative of a precision greater than about 45%. Should the square of the correlation coefficient, $R^2<0.997$, then the number of used channels or data points is decreased by 50. The least square fit is recalculated until $R^2 \geq 0.993$.

Should $R^2>0.993$, then the least squares standard error estimate for Y, Ey, is checked. Ey is a local constraint on linearity. Should Ey=0.005 I, then stop the iteration. I is the intercept value. Should Ey≠0.005 I, then successively interpolate, namely, increase and decrease, between the number of channels used in two successive iterations until $$[1-0.005 \text{ I/Ey}] \leq 0.005$$

The limiting values for $R^2$ and Ey are for the sake of the described example and may be chosen as desired.

$$R^2 = \frac{[N \Sigma(1 - Ei) Ci - \Sigma(1 - Ei) \Sigma Ci]^2}{[N \Sigma(1 - Ei)^2 - (\Sigma(1 - Ei))^2][N \Sigma C_i^2 - (\Sigma C_i)^2]}$$

$$Ey = \frac{[\Sigma(CPM_m - CPM_c)^2]^{\frac{1}{2}}}{N}$$

where $CPM_m$ is the measured value for CPM and $CPM_c$ is the value calculated from the straight-line fit. N may be used here rather than N−1 since in general 300–500 data points are available.

Figure 5:
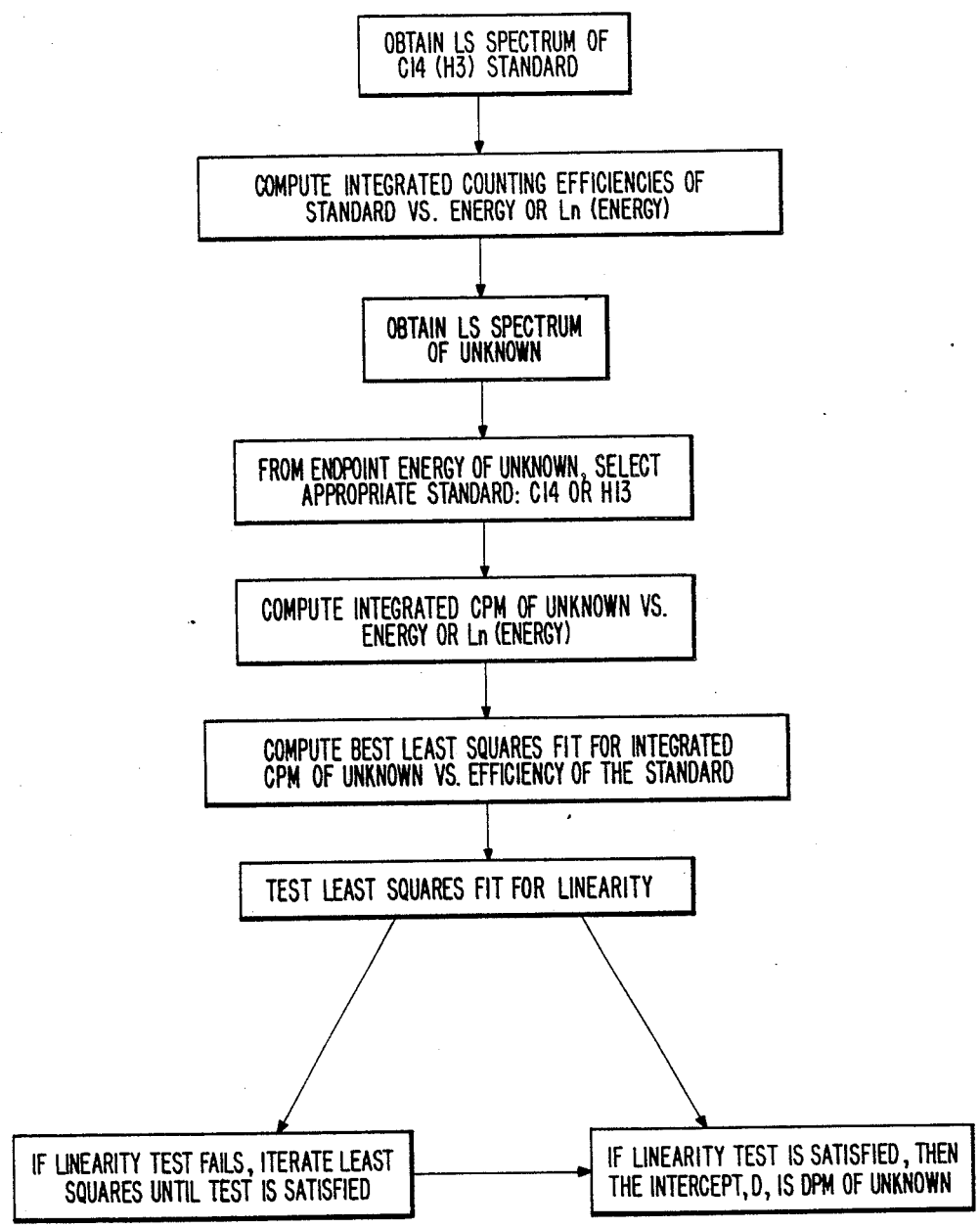
FIG. 5 is a flow chart illustrating the algorithm depicting the activity determination according to the best linear fit.

The flow chart of FIG. 5 illustrates the determination of the activity according to these algorithms which provides the best linear curve fit. A computer or miniprocessor associated with the counter operates in terms of this procedure and these constraints.

Table 1 provides dynamic interative results from three sulfur-35 samples following the above procedure.

Table 2 provides analogous dynamic iterative results for two tritium samples.

TABLE 1
ITERATIVE RESULTS FOR SULFUR-35 SAMPLES: DPM = 92700

| Iterative Channels: | | 0–500 | 0–450 | 0–400 | 0–406 | 0–411 |
|---|---|---|---|---|---|---|
| Sample 1 | DPM | 90,862 | 90,760 | 92,361 | 92,299 | 92,246 |
|  | Ey | 1357 | 723 | 406 | 434 | 459 |
|  | Slope | −1615 | −1739 | −1842 | −1830 | −1820 |
|  | $R^2$ | .99410 | .99673 | .99781 | .99773 | .99765 |
|  |  |  |  | % Error = 0.27 | | |

| Iterative Channels: | | 0–500 | 0–450 | 0–400 | 0–350 | 0–352 |
|---|---|---|---|---|---|---|
| Sample 2: | DPM | 87,745 | 90,294 | 91,813 | 92,791 | 92,757 |
|  | Ey | 3738 | 1764 | 856 | 454 | 465 |
|  | Slope | −2198 | −2550 | −2809 | −3011 | −3003 |
|  | $R^2$ | .97626 | .99100 | .99584 | .99741 | .99737 |
|  |  |  |  | % Error = −0.28 | | |

| Iterative Channels: | | 0–400 | 0–350 | 0–300 | 0–250 | 0–200 | 0–222 |
|---|---|---|---|---|---|---|---|
| Sample 3: | DPM | 66,859 | 76,076 | 83,734 | 89,563 | 94,238 | 92,257 |
|  | Ey | 7951 | 4327 | 1956 | 792 | 286 | 461 |
|  | Slope | −4441 | −6347 | −8189 | −9767 | −11148 | −10551 |
|  | $R^2$ | .87383 | .94968 | .98203 | .99304 | .99701 | .99560 |
|  |  |  |  | % Error = 0.26 | | | |

The slope and intercept (DPM) are shown for each iteration.

$R^2$ is the square of the correlation coefficient.

Ey is the standard error of estimate for Y.

TABLE 2
ITERATIVE RESULTS FOR TRITIUM SAMPLES WITH 476,000 DPM

| Iterative Channels: | 0–400 | 0–350 | 0–300 | 0–250 | 0–246 |
|---|---|---|---|---|---|
| DPM | 420,947 | 440,521 | 464,522 | 487,389 | 489,096 |
| Ey | 14,717 | 10,379 | 5683 | 2620 | 2446 |
| Slope | −4553 | −4976 | −5518 | −6065 | −6108 |
| $R^2$ | .97881 | .98659 | .99350 | .99695 | .99712 |
|  |  | % Error = −2.8 | | | |

| Iterative Channels | 0–400 | 0–350 | 0–300 | 0–250 | 0–200 | 0–208 |
|---|---|---|---|---|---|---|
| DPM | 319,835 | 348,324 | 392,055 | 441,212 | 487,072 | 480,114 |
| EY | 24,299 | 19,570 | 12,154 | 5754 | 2071 | 2491 |
| Slope | −3637 | −4253 | −5241 | −6418 | −7576 | −7397 |
| $R^2$ | .91535 | .93795 | .96791 | .98699 | .99544 | .99454 |
|  |  | % Error = −0.86 | | | | |

Intercept (DPM), Ey, Slope and $R^2$ have the same meaning as in Table 1.

With this system, the activity of standard and unknown samples of selected isotopes can be determined at different quench levels. For instance, the isotopes may be Carbon-14, tritium, sulphur-35 or phosphorous-32. Different degrees of quench can be used so that a counting efficiency lower than 80%, and as low as about 20% can be determined with the appropriate isotope and quench level. A different number of windows or channels or data points of the multi-channel analyzer is used according to the samples. The number is normally greater than 100, and usually between 200 and 600 according to the sample being measured. By using these multiple channels to determine the counting efficiencies and then selectively determining the appropriate linear equation reflecting an appropriate number of windows an accurate determination of the activity of the sample can be obtained by the efficiency extrapolation methodology.

The scope of the invention is to be determined by the following claims. The examples above are capable of many variations within the ambit of the invention.

I claim:

1. A method for determining radioactivity in a liquid scintillation counter comprising:
   a. obtaining count rates for a standard sample for multiple channels of a multichannel analyzer over at least part of the spectrum of the standard sample;
   b. determining the counting efficiencies for multiple channels of the analyzer;
   c. obtaining count rates for an unknown sample for multiple channels of the multi-channel analyzer over at least part of the spectrum of the unknown sample;
   d. determining a regression equation from the integrated count rates of the unknown sample and the counting efficiencies of the standard sample;
   e. selecting a region of the spectrum of the unknown sample to obtain a selected modified regression equation reducing error below a predetermined level; and
   f. extrapolating the modified regression equation to provide the activity of the unknown sample.

2. The method as claimed in claim 1 wherein the standard sample permits the determination of unknown tritium samples, selectively quenched or unquenched.

3. The method of claim 1 wherein selecting the modified regression equation is defined by predetermined values of the standard error for the integrated count rate, and the square of a correlation coefficient of a least squares line fit.

4. The method of claim 1 including correlating the integrated count rate with the counting efficiencies of the standard.

5. A method for determining radioactivity in a liquid scintillation counter comprising:
   a. obtaining the count rates for a standard sample for multiple channels of a multi-channel analyzer covering the spectrum of the standard sample;
   b. determining the counting efficiencies for the multiple channels of the analyzer;
   c. obtaining count rates for an unknown beta emitting sample for multiple channels of the multi-channel analyzer covering the spectrum of the unknown sample;
   d. determining a selected linear regression equation from the integrated count rates of the unknown sample and the counting efficiencies of the standard sample to fit the region of the spectrum of the unknown sample; and e. extrapolating the equation to obtain the activity of the unknown sample.

6. A method as claimed in claim 5 including selecting the regression equation wherein the error in the activity is limited to a least squares line fit.

7. A method as claimed in claim 5 wherein the unknown sample is selectively the isotopes of carbon-14, tritium, phosphorus-32 or sulphur-35.

8. A method as claimed in claim 7 wherein the unknown sample is selectively quenched.

9. A method as claimed in claim 7 wherein the number of channels for the spectrum is determined by the selected isotope.

10. A method as claimed in claim 9 wherein the number of channels is greater than about 100.

11. A method as claimed in claim 10 wherein the number of channels is between about 200 to 600.

12. A method as claimed in claim 8 wherein the quench level causes the counting efficiencies to be less than about 80%.

13. A method as claimed in claim 12 wherein the counting efficiency is about 20%.

14. A liquid scintillation counter comprising:
 a. a multi-channel analyzer;
 b. means for generating a multi-channel spectrum of a radioactive standard sample in the analyzer;
 c. means for determining the counting efficiencies for multiple channels of the analyzer and for determining a regression equation for the reference sample; and
 d. means for determining the activity of an unknown sample per channel by a modified regression equation determined by counting efficiencies of the standard sample and count rates of an unknown sample by iteratively determining the least squares fit to reduce error below a predetermined level.

15. The counter as claimed in claim 14 wherein the iterations dynamically fit the regression equation to a selected unknown sample and selected quench level of the unknown sample.

16. The counter as claimed in claim 15 wherein the regression equation is selectively linear, exponential or polynomial.

17. The counter as claimed in anyone of claims 14, 15 or 16 including means for automatically determining the iteration endpoint of the unknown sample and means for making the activity determination.

18. A liquid scintillation counter comprising:
 a. a multi-channel analyzer;
 b. means for generating a multi-channel spectrum of a radioactive standard sample in the analyzer;
 c. means for determining the counting efficiencies of multiple channels of the analyzer; and
 d. means for determining the activity of an unknown sample by using a selected linear portion of a regression equation determined by counting efficiencies of the standard sample and count rates of the sample.

19. A counter as claimed in claim 18 including means for selecting different isotopes for the standard sample and unknown sample.

* * * * *